US005367269A

United States Patent [19]
Yanagidaira et al.

[11] Patent Number: 5,367,269
[45] Date of Patent: Nov. 22, 1994

[54] SYSTEM FOR PRODUCING AN OSCILLATING JAMMING SIGNAL UTILIZING A PHASE-LOCKED LOOP

[75] Inventors: Masatoshi Yanagidaira; Takashi Hashimoto, both of Tokyo, Japan

[73] Assignee: Pioneer Electronic Corporation, Tokyo, Japan

[21] Appl. No.: 48,225

[22] Filed: Apr. 20, 1993

Related U.S. Application Data

[62] Division of Ser. No. 788,679, Nov. 6, 1991, Pat. No. 5,228,082.

[30] Foreign Application Priority Data

Nov. 8, 1990 [JP] Japan .................. 2-303330
Sep. 19, 1991 [JP] Japan .................. 3-268760

[51] Int. Cl.$^5$ .................. H03L 7/06; H03L 7/08; H03L 7/16; H04K 3/00
[52] U.S. Cl. .................. 331/14; 331/2; 331/17; 331/179; 380/7; 455/1
[58] Field of Search ............. 331/2, 4, 14, 16, 17, 331/20, 49, 74, 77, 78, 179; 455/1; 380/7, 20

[56] References Cited
U.S. PATENT DOCUMENTS

| | | | |
|---|---|---|---|
| 3,729,688 | 4/1973 | Cerney, Jr. et al. | 331/179 X |
| 3,927,384 | 12/1975 | Jezo | 331/2 |
| 4,410,860 | 10/1983 | Kipp et al. | 331/1 A |
| 4,453,136 | 6/1984 | Kelland | 331/14 X |
| 4,510,461 | 4/1985 | Dickes et al. | 331/17 X |
| 4,629,999 | 12/1986 | Hatch et al. | 331/17 X |
| 4,677,394 | 6/1987 | Vollmer | 331/16 X |
| 4,912,760 | 3/1990 | West, Jr. et al. | 331/44 X |
| 4,980,652 | 12/1990 | Tarusawa | 331/16 X |

*Primary Examiner*—David Mis
*Attorney, Agent, or Firm*—Nikaido, Marmelstein, Murray & Oram

[57] ABSTRACT

A system for producing an oscillating signal includes a phase-locked loop including a control voltage producing circuit. The control voltage producing circuit is provided for producing a plurality of predetermined control voltages, with each of the predetermined control voltages corresponding to a desired frequency. A plurality of memories are provided in the phase-locked loop for storing the predetermined control voltages. A control device is connected to the plurality of memories for storing the predetermined control voltages in the memories in a state where the phase-locked loop is closed, and for deriving at least one of the predetermined control voltages stored in the memories in a state where the phase-locked loop is opened. A voltage-control oscillator is provided in the phase-locked loop to be operated by the predetermined control voltage derived from one of the memories for producing the oscillating signal having a desired frequency dependent upon the desired voltage.

6 Claims, 11 Drawing Sheets

SYSTEM FOR PRODUCING AN OSCILLATING JAMMING SIGNAL UTILIZING A PHASE-LOCKED LOOP

This is a division of application Ser. No. 07/788,679 filed Nov. 6, 1991, now U.S. Pat. No. 5,228,082.

BACKGROUND OF THE INVENTION

The present invention relates to a system provided in a CATV (cable television) for producing a jamming signal, thereby preventing nonsubscribers from poaching pay television programs.

A subscriber who contracted with a center for CATV must pay a fee monthly or a fee for every program in order to receive television programs from the CATV. Accordingly, it is necessary to be able to prevent the poaching of pay television programs. There are some scrambling systems where the television signal is processed at the center so that the television signal can not be received through an ordinary television set.

In a jamming method as one of the scrambling systems, an interference wave or noise is inserted in a band of the CATV signal.

Figure 13:
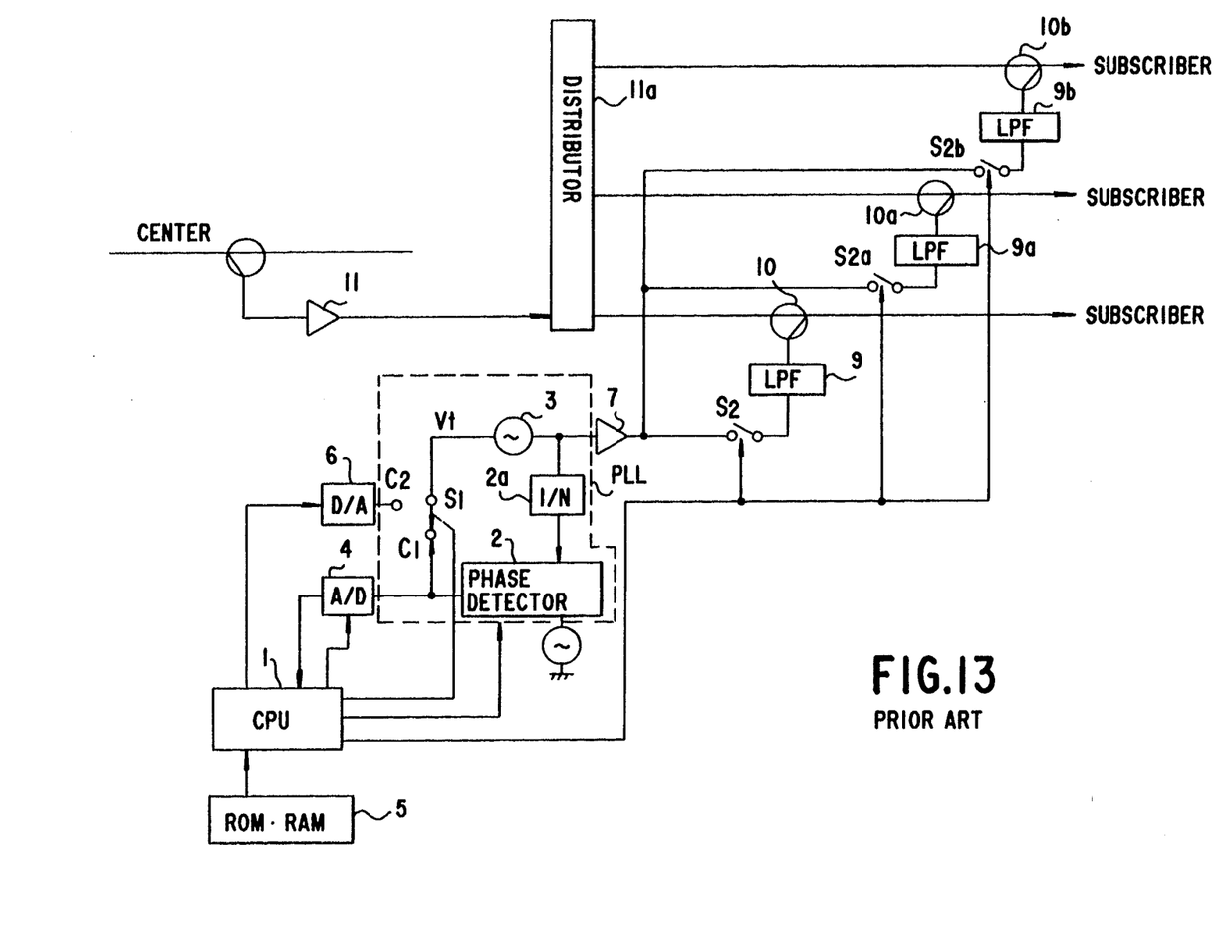
FIG. 13 is a schematic diagram showing a conventional jamming signal producing system.

FIG. 13 shows a conventional jamming signal producing system. The system is provided in a trunk line to subscribers.

A TV signal from a center is applied to a distributor 11a of the system through a buffer amplifier 11. The signal is distributed and applied to individual television sets of subscribers through combiners 10, 10a and 10b, respectively.

The jamming signal producing system comprises a CPU 1 having a memory 5, a PLL (phase-locked loop) including a phase detector 2, a 1/N divider 2a and a VCO (voltage-controlled oscillator) 3, an A/D converter 4 and a D/A converter 6. The CPU 1 is operatively connected to the PLL 2, A/D converter 4, and D/A converter 6. The phase detector 2 is connected to the VCO 3 through a switch S1 and to the A/D converter 4. The switch S1 has two fixed contacts C1 and C2 operated by an output of the CPU 1. The D/A converter 6 is connected to the VCO 3 through the contact C2 of the switch S1. The VCO 3 is connected to switches S2, S2a and S2b through a buffer amplifier 7. The switches S2, S2a and S2b are closed by the output of the CPU 1 to connect VCO 3 to the low pass filters 9, 9a and 9b, respectively.

To generate a jamming signal, the CPU 1 operates to close the contact C2 of the switch S1. The data stored in the memory 5 is applied to the D/A converter 6 in which the data is converted into an analog signal. The analog signal is applied to the VCO 3 through the switch S1. The VCO 3 oscillates, namely produces a jamming signal having a frequency based on the data. The jamming signal is applied to the combiners 10, 10a and 10b through the low pass filters 9, 9a and 9b accordance with the operation of the switches S2, S2a and S2b. The jamming signal is combined with the TV signal from the distributor 11a in the combiners 10, 10a and 10b and the combined signals are fed to individual television sets of the subscribers.

Figure 14:
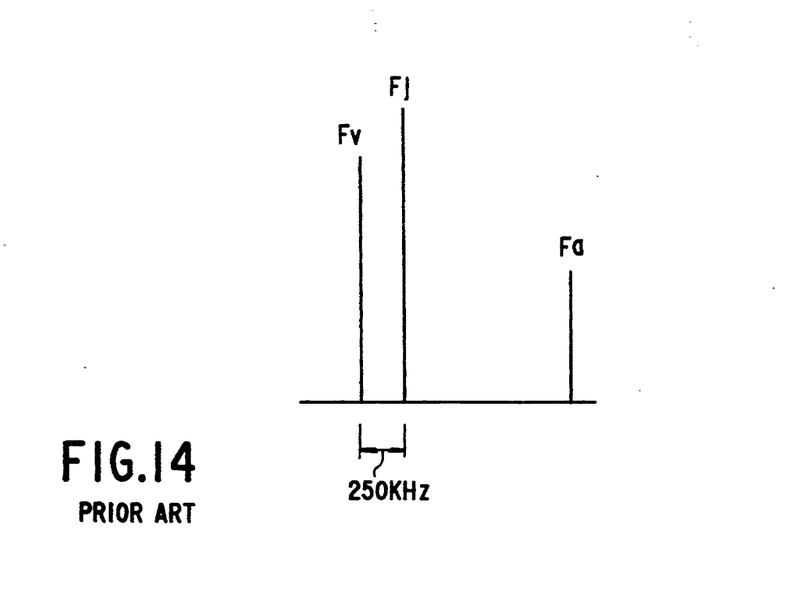
FIG. 14 is a diagram showing the jamming signal and audio/video signals.

As shown in FIG. 14, in the combined signal, the jamming signal Fj is inserted a band including a video signal FV and an audio signal Fa. The frequency of the jamming signal stands from the video signal Fv by 250 kHz.

If temperature or humidity around the jamming signal producing device changes, a drift occurs in the frequency of the jamming signal. If the drift occurs, the frequency interval of 250 kHz is not maintained so that a sufficient scramble effect is not obtained, or the jamming signal interferes an adjacent channel. Thus, it is necessary to perform calibration to correct the drift.

In calibration operation, the CPU 1 operates to close the contact C1 of the switch S1. The output of the phase detector 2 is applied to the A/D converter 4 wherein the output signal is converted into a digital signal. The digital signal is applied to the CPU 1 and compared with the data stored in the memory 5, so that an output signal in consideration of the drift is produced from the CPU 1 and applied to the D/A converter 6. Then, the contact C2 closes, and hence the analog signal converted at the O/A converter S is applied to the VCO 3 which oscillates the jamming signal at a calibrated frequency. The calibration is continuously performed at interval of 10 to 15 minutes.

In order to effectively scramble the television signal, it is necessary to accurately control the amplitude, frequency and cycle of the jamming signal.

It is recognized by experience that the amplitude of the jamming signal is selected to increase the jamming signal by 12 to 14 dB, the frequency is larger than the video signal Fv by 250 kHz, and the cycle for jamming the image is several tens msec.

In the system, since the drift is often calibrated, the jamming signal is not sufficiently inserted the TV signal, and it is impossible to scan the channel to be scrambled at high speed so that the scramble effect can not be ensured.

Further, the reduction of the lock-up time in the PLL circuit is not considered, which also aggravates the scramble effect.

The A/D and D/A converters provided in the system are expensive, causing the increase of the manufacturing cost of the system.

SUMMARY OF THE INVENTION

The object of the present invention is to provide a jamming signal producing system which may scan a channel to be scrambled at a high speed without calibration and is manufactured at a low cost.

According to the present invention, there is provided a system for producing a jamming signal to be inserted in a band of CATV, comprising, a first jamming signal producing circuit including a control voltage producing circuit for producing a control voltage corresponding to the band, and a first voltage-controlled oscillator for producing a first jamming signal having a first jamming frequency dependent on the control voltage, voltage storing means for storing the control voltage, second jamming signal producing means for producing a second jamming signal, and control means for controlling the production of the first and second jamming signals.

In an aspect of the invention, the first jamming signal producing circuit is a phase-locked loop comprising the first voltage-controlled oscillator, a programmable divider controlled by the control means for producing a divided frequency corresponding to the band, a phase detector for comparing the divided frequency with a reference frequency and for producing a difference frequency, and a low pass filter for converting the difference frequency to the control voltage, and the voltage storing means includes capacitors and first switches operated by the control means for controlling the storing of the control voltage in the capacitors.

In another aspect, the second jamming signal producing means comprises second switches operated by the control means for controlling the discharging of the control means for controlling the discharging of the control voltage stored in the capacitors, and a second voltage-controlled oscillator for producing the second jamming signal having a second jamming frequency dependent on the discharged voltage.

Other objects and features of this invention will become understood from the following description with reference to the accompanying drawings.

DETAILED DESCRIPTION OF THE PREFERRED EMBODIMENTS

Figure 1:
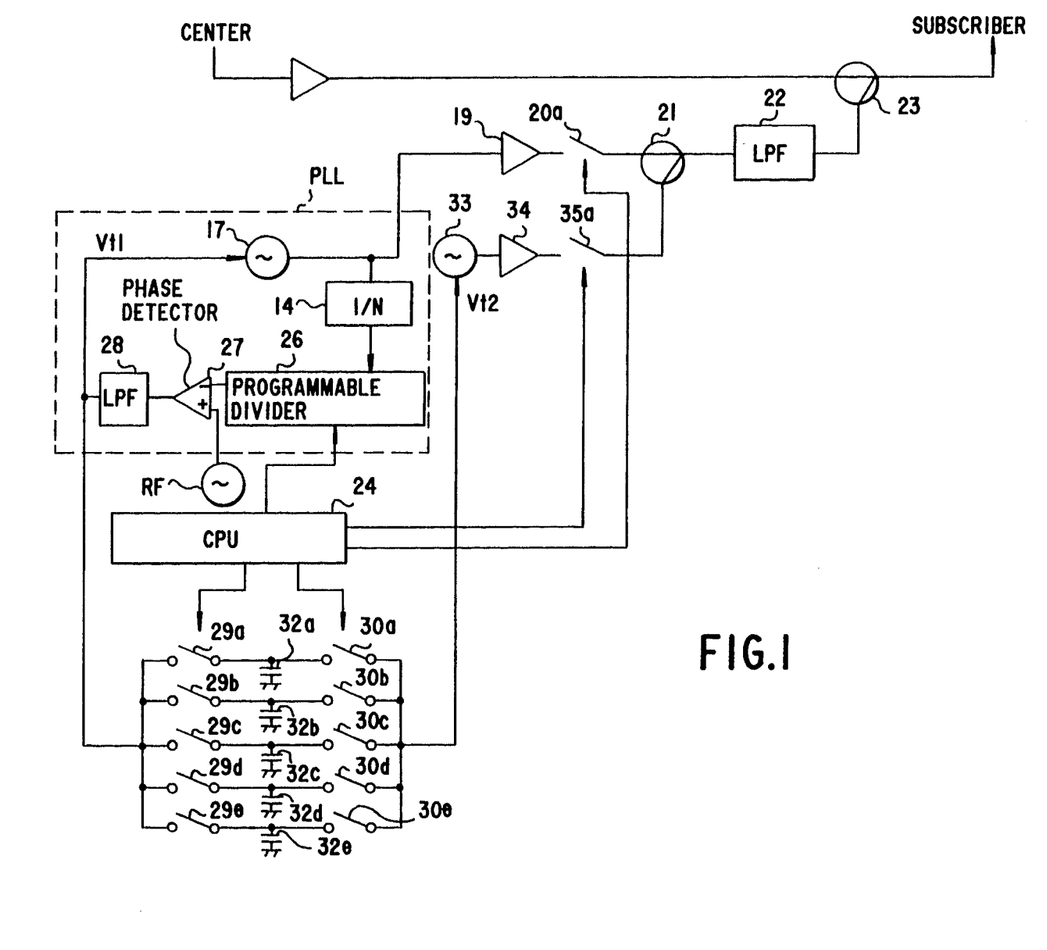
FIG. 1 is a schematic diagram showing a jamming signal producing system according to the present invention.

Referring to FIG. 1, a jamming signal producing system of the present invention has a jamming signal producing circuit comprising a PLL including a first VCO 17 which produces an audio jamming signal for an audio signal. The system further has a second VCO 33 which produces a video jamming signal for a video signal.

The PLL comprises a 1/N divider 14, a programmable divider 26, a phase detector 27, a low pass filter (LPF) 28, and the first VCO 17. The output of the programmable divider 26 is connected to input of the phase detector 27. The phase detector 27 compares the output of the programmable divider 26 with a reference frequency from a reference frequency generator RF to produce a difference phase. The difference phase is converted to a DC voltage Vt1 by the LPF 28. The output of the VCO 17 is connected to a combiner 21 through an amplifier 19 and a switch 20a. The VCO 33 is connected to the combiner 21 through an amplifier 34 and a switch 35a. The combiner 21 is connected to a combiner 23 through a low pass filter 22.

The system has a CPU 24 for controlling the operation of the system. The CPU 24 is operatively connected to the programmable divider 26, the switches 20a and 35a, and switches 29a to 29e and 30a to 30e. The CPU 24 applies a control signal to the programmable divider 26 so that the phase detector 27 produces an output necessary for producing a control voltage Vt1 corresponding to a channel to be scrambled. Between the switches 29a to 29e and 30a to 30e and the ground, capacitors 32a to 32e are connected to the respective switches. The capacitors 32a to 32e charge the voltage corresponding to the channels, for example Nos. 2, 3, 4, 5 and 6, to be scrambled, respectively. The switches 30a to 30e are connected to be connected to the VCO 33. The output of the LPF 28 is connected to the capacitors 32a to 32e through the switches 29a to 29e.

A TV signal from a center is fed to a subscriber through the combiner 23.

The operation of the system will be described hereinafter. In the system, the channels 2 to 6 are scrambled.

The control signal from the CPU 24 is applied to the programmable divider 26 in accordance with a program, so that the divider produces an output having a frequency corresponding to a channel to be scrambled. The phase detector 27 compares the output with a reference frequency from a reference frequency generator RF to obtain a difference phase. The difference phase is converted to the control voltage Vt1. The voltage Vt1 is applied to the first VCO 17. Thus, the first VCO 17 produces an audio jamming signal having a frequency corresponding to a channel to be scrambled. The audio jamming signal is applied to the combiner 21 through the amplifier 19 combiner and the switch 20a.

The voltage Vt1 is further applied to the switches 29a to 29e. The operation of each of the switches 29a to 29e is controlled by the output of the CPU 24, corresponding to the scrambled channel. The switches 29a to 29e are sequentially turned on at regular intervals. Each switch is closed for a period, for example of 10 msec. The capacitors 32a to 32e are charged with the voltage Vt1 corresponding to the respective channels to be scrambled.

Each of the capacitors 32a to 32e is sequentially discharged. The switches 30a to 30e are turned on in order of the channel in a cycle T of 200 μsec by the output of the CPU 24. Thus, the voltage charged in the capacitor is applied to the second VCO 33 as a control voltage Vt2. The second VCO 33 produces a video jamming signal for the video signal corresponding to the selected channel to be scrambled. The jamming signal is applied to the combiner 21, through the amplifier 34 and the switch 35a.

The jamming signals for the sound and the image are applied to the combiner 23 through the low pass filter 22. The TV signal is combined with the jamming signals to be scrambled.

If a drift of the frequency of the jamming signal from a VCO 17 occurs, the PLL operates to correct the drift. More particularly, if the frequency of the jamming signal increases, the frequency of the divider 26 increases. However, the output voltage of the Low Pass Filter 28 decreases with the increment. Thus, the output frequency of the VCO 17 is corrected to the desired frequency.

Figure 2:
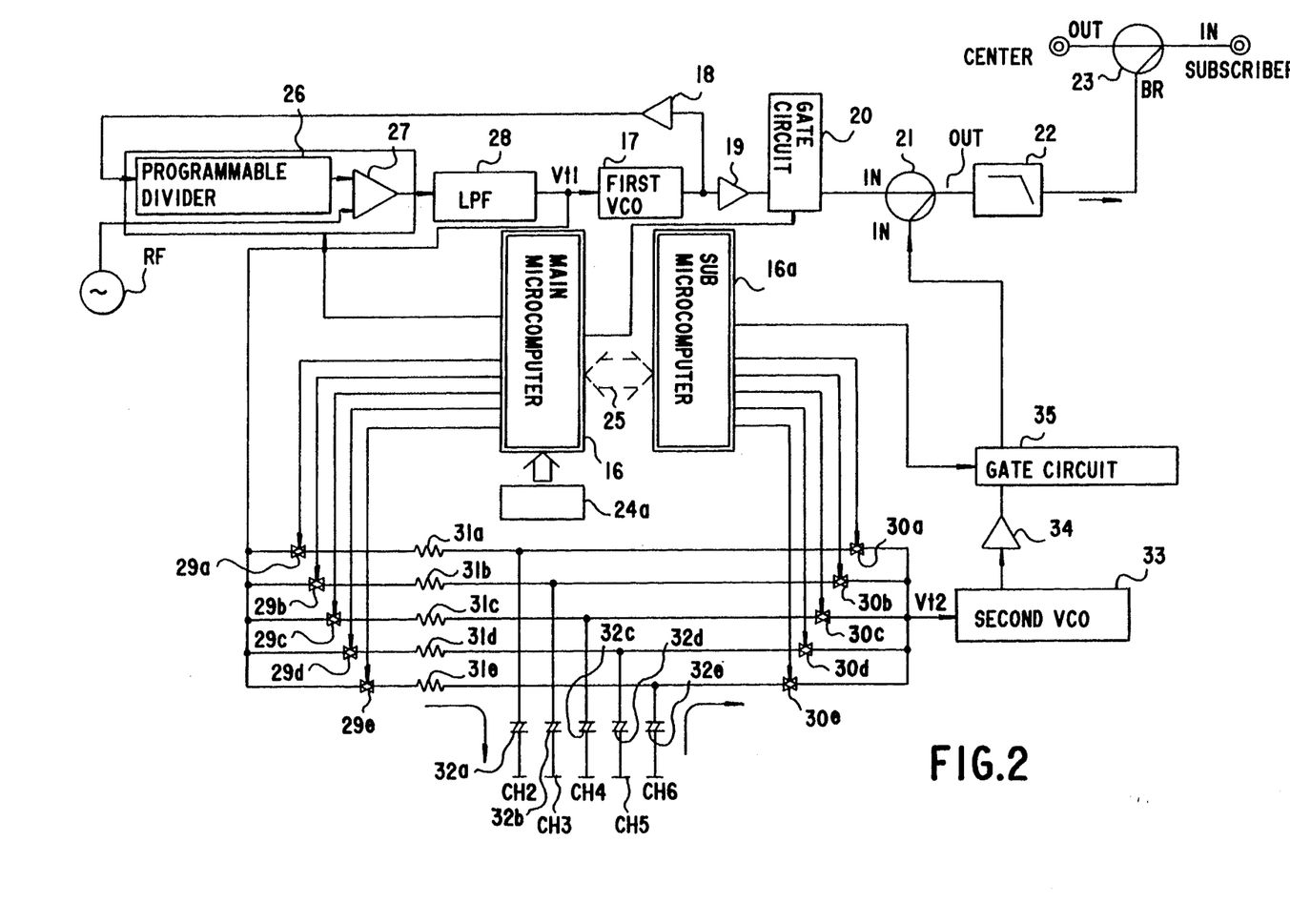
FIG. 2 is a schematic diagram showing a second embodiment of the present invention.

Referring to FIG. 2 showing the second embodiment, the same parts as the first embodiment are identified with the same reference numerals as FIG. 1.

The system has a main microcomputer 16 and a sub microcomputer 16a connected to the main microcomputer 16 through a bus line 25.

The PLL has the programmable divider 26 and the phase detector 27. The control signal of the main microcomputer 16 is applied to the programmable divider 26. The phase detector 27 is applied with a reference frequency signal from the reference frequency generator RF and a divided frequency signal from the programmable divider 26. The output of the phase detector 27 is applied to the first VCO 17 through the LPF 28, and the output of the first VCO 17 is applied to the programmable divider 26 through an amplifier 18. The output of the LPF 28 is further connected to the analog switches 29a to 29e.

A gate circuit 20 connected to the VCO 17 through the amplifier 19 is operated by the output of the main microcomputer 16. The main microcomputer 16 is connected to a jamming channel set section 24a which produces a signal for indicating a channel to be scrambled. The microcomputer 16 has a memory (not shown) which stores data of jamming carrier frequency of each channel.

The sub microcomputer 16a has a memory (not shown) which stores data of information of each channel transmitted from the center. The sub microcomputer 16a is operatively connected to analog switches 30a to 30e. Resistors 31a to 31e are connected between the analog switches 29a to 29e and the capacitors 32a to 32e.

A gate circuit 35 connected to the second VCO 33 through the amplifier 34 is operated by the output of the sub microcomputer 16a.

The operation of the system will be described hereinafter with reference to FIGS. 3 and 4.

Figure 3:
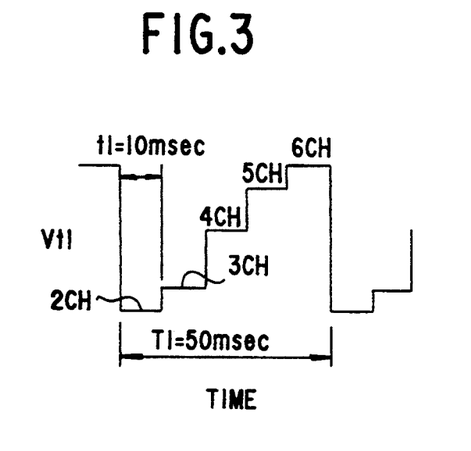
FIG. 3 is a diagram showing a relationship between a first voltage Vt1 and a time.
Figure 4:
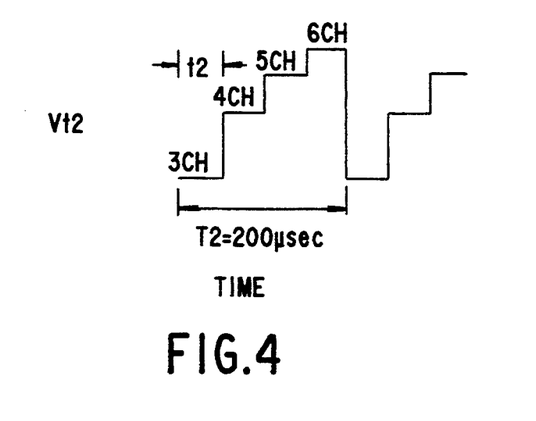
FIG. 4 is a diagram showing a relationship between a second voltage and a time.

As shown in FIG. 3, the voltage Vt1 is applied to the first VCO 17 at the frequency of a cycle T1 of 50 msec for five channels 2 to 6 and hence a period t1 of each channel is 10 msec. When the voltage Vt1 for the channel 2 is applied to the VCO 17, the switch 29a is closed, thereby charging the capacitor 32a with the voltage Vt1. Other capacitors are similarly charged in sequence.

The voltage Vt2 is applied to the second VCO 33 at the frequency of a cycle T2 (200 μsec) for a period t2 (50 μsec) for each channel. FIG. 4 shows one cycle of the application of Vt2 for the channel 3 to channel 6 during the application of VT1 for the channel 2.

The system is operated approximately in the same manner as the system of the first embodiment.

Namely, the phase detector 27 produces an output at frequency corresponding to the difference between the frequency of the divided output from the divider 26 and the reference frequency. The DC voltage Vt1 from the LPF 28 is applied to the first VCO 17 which generates an audio jamming signal at a frequency corresponding to the frequency and phase indicated by the control signal from the microcomputer 16. The jamming signal is applied to the combiner 21 through the amplifier 19 and the gate circuit 20.

When the DC voltage Vt1 for the channel 2 from the LPF 28 is applied to the analog switch 29a, the analog switch 29a is closed in accordance with the control signal of the main microcomputer 16 for a periods of 10 msec. Thus, the capacitor 32a is charged with the voltage Vt1 of the channel 2.

Similarly, when the voltages Vt1 corresponding to the respective channels 3 to 6 are applied to the analog switches, the switches 29b to 29e are closed for 10 msec in order to charge the voltages in the capacitors 32b to 32e, respectively.

Figure 6:
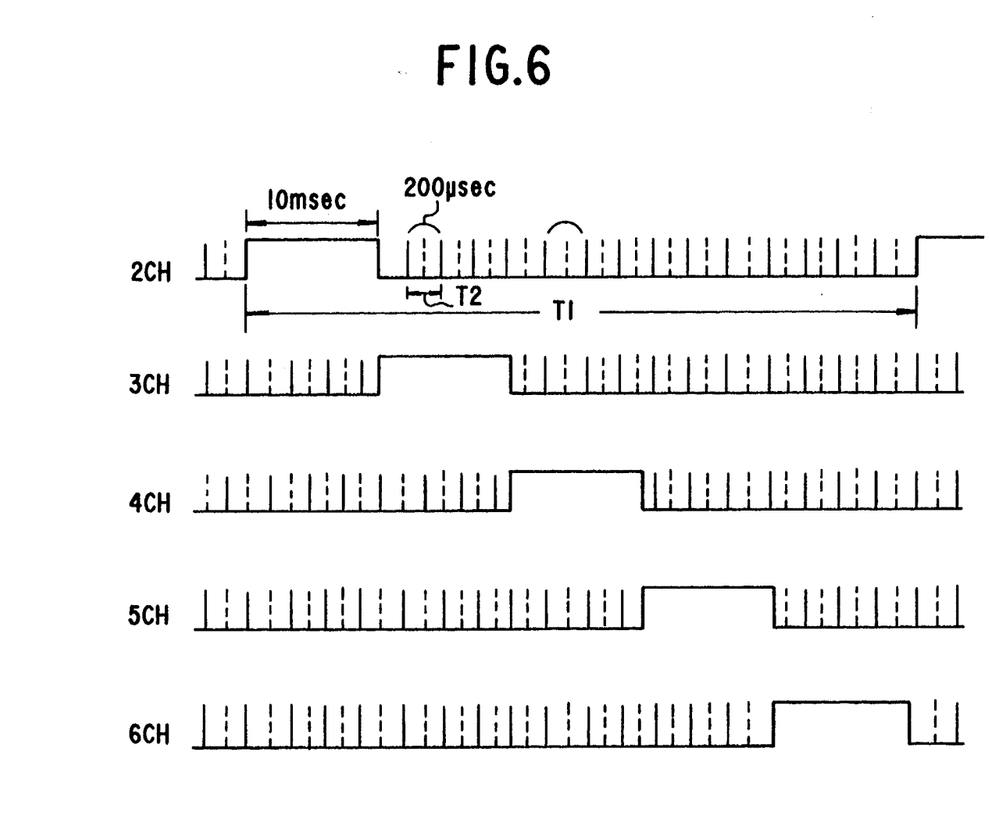
FIG. 6 is a diagram showing jamming signals corresponding to respective channels.

The sub microcomputer 16a operates to turn on the analog switches 30a to 30e in order for a period t2 in the cycle T2. When the sub microcomputer 16a reads the data in the main microcomputer 16 through the bus line 25 that the first VCO 17 scans the channel 2, the analog switches 30b to 30e for the other channels are turned on and off at a high speed. As shown in FIG. 6, the second VCO 33 scans the other channels, jumping over the channel scrambled by the first VCO 17.

The voltage Vt1 charged in each of the capacitors 32a to 32e is applied to the second VCO 33 as the voltage Vt2. The VCO 33 generates a video jamming signal which is applied to the combiner 21 through the amplifier 32 and the gate circuit 35 for a period t2 of the channel 2.

The jamming signal of the audio signal is applied to the combiner 21 for a period of 10 msec, and the jamming signal of the video signal is applied to the combiner 21 for a period of 50 μsec. The combined jamming signal is applied to the combiner 23 through the low pass filter 22.

Figure 5:
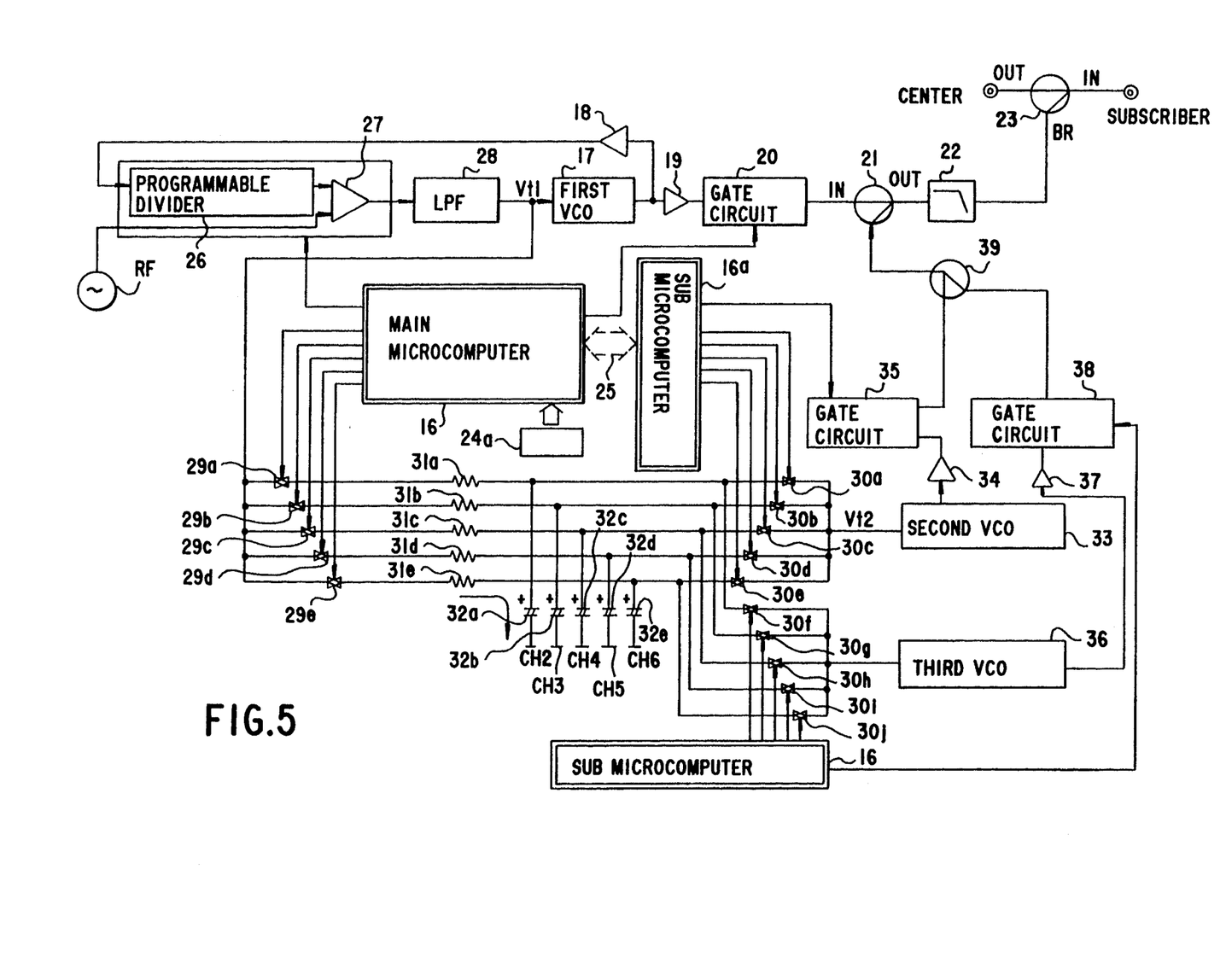
FIG. 5 is a schematic diagram showing a third embodiment of the present invention.

FIG. 5 shows the third embodiment. The system is provided with a third VCO 36 which produces a video jamming signal of the video signal. The VCO 36 is connected to analog switches 30f to 30f which are in turn connected to analog switches 30a to 30e in parallel. The sub microcomputer 16a is operatively connected to the analog switches 30f to 30j. The third VCO 36 is connected to a combiner 39 through an amplifier 37 and a gate circuit 38 operated by the sub microcomputer 16a. The second VCO 33 is connected to the combiner 39 through the amplifier 34 and the gate circuit 35. The combiner 39 is connected to the combiner 21.

In the third embodiment, the jamming signal is applied at a shorter cycle as shown by a dashed line of FIG. 6. Consequently, the jamming effect of the video signal is enhanced.

Figure 7:
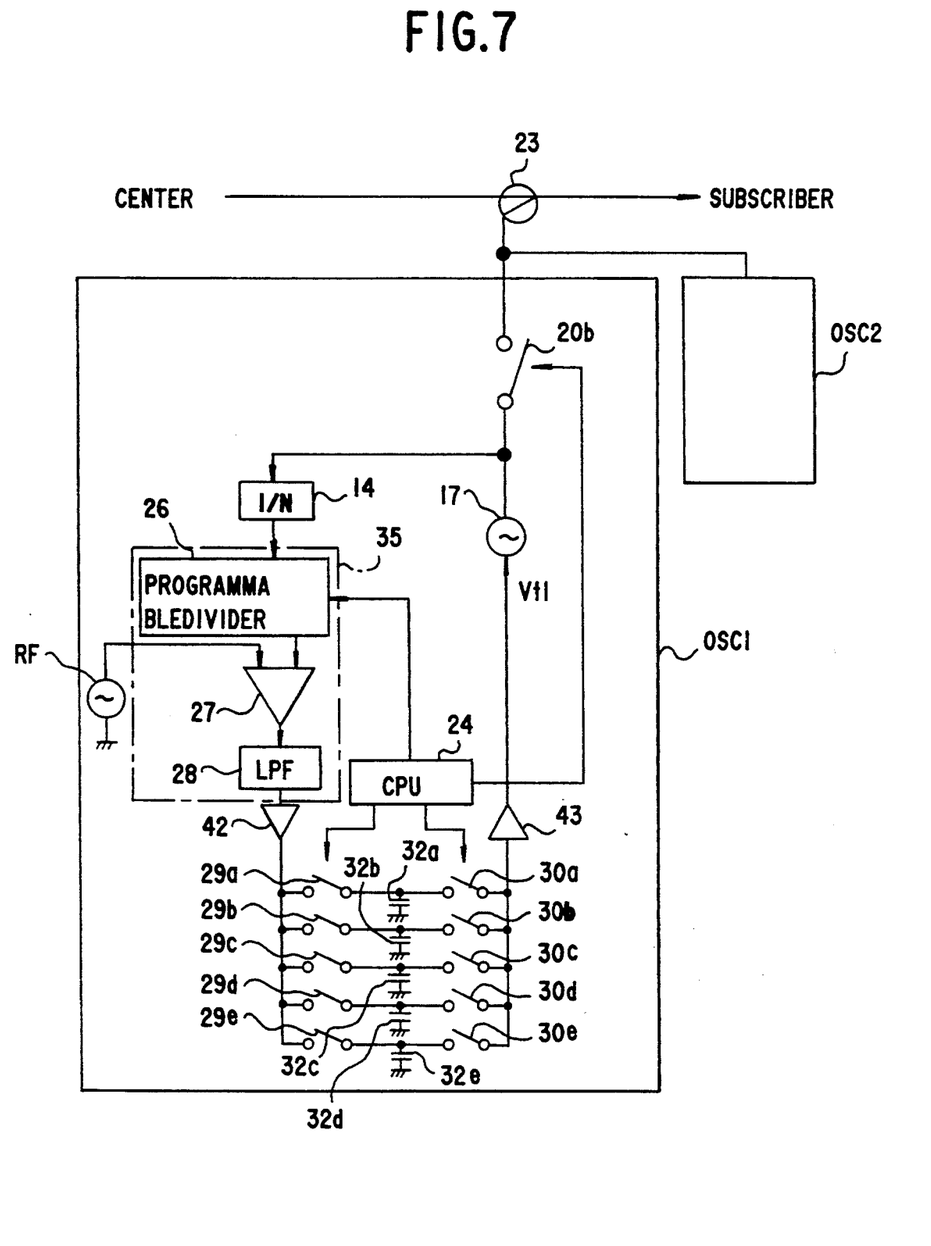
FIG. 7 is a schematic diagram showing a fourth embodiment of the present invention.

Referring to FIG. 7 showing the fourth embodiment, the same parts as the first embodiment are identified with the same reference numerals as FIG. 1.

The system has a first oscillator OSC1 and a second oscillator OSC2.

The first oscillator OSC1 comprises a control voltage generator 35, the programmable divider 26, phase detector 27 and LPF 28. The output of the LPF 28 is connected to the analog switches 29a to 29e through a buffer amplifier 42 having a small impedance. The analog switches 30a to 30e are connected to the VCO 17 through a buffer amplifier 43 having a large impedance. The output of the VCO 17 is applied to the combiner 23 through a switch 20b and to the programmable divider 26 through the 1/N divider 14. The switch 20b is operatively connected to the CPU 24.

The second oscillator OSC2 has the same construction as the first oscillator OSC1 and the output thereof is connected to the combiner 23, so that those oscillators are cooperated with each other for scrambling. For example, the first oscillator OSC1 is used for producing an audio jamming signal and the second oscillator OSC2 is for a video jamming signal. To give another example, the first oscillator OSC1 is used for jamming signals for the early part of the channels 2 to 6 and the second oscillator OSC2 is for the latter part of the channels.

Figures 8, 9:
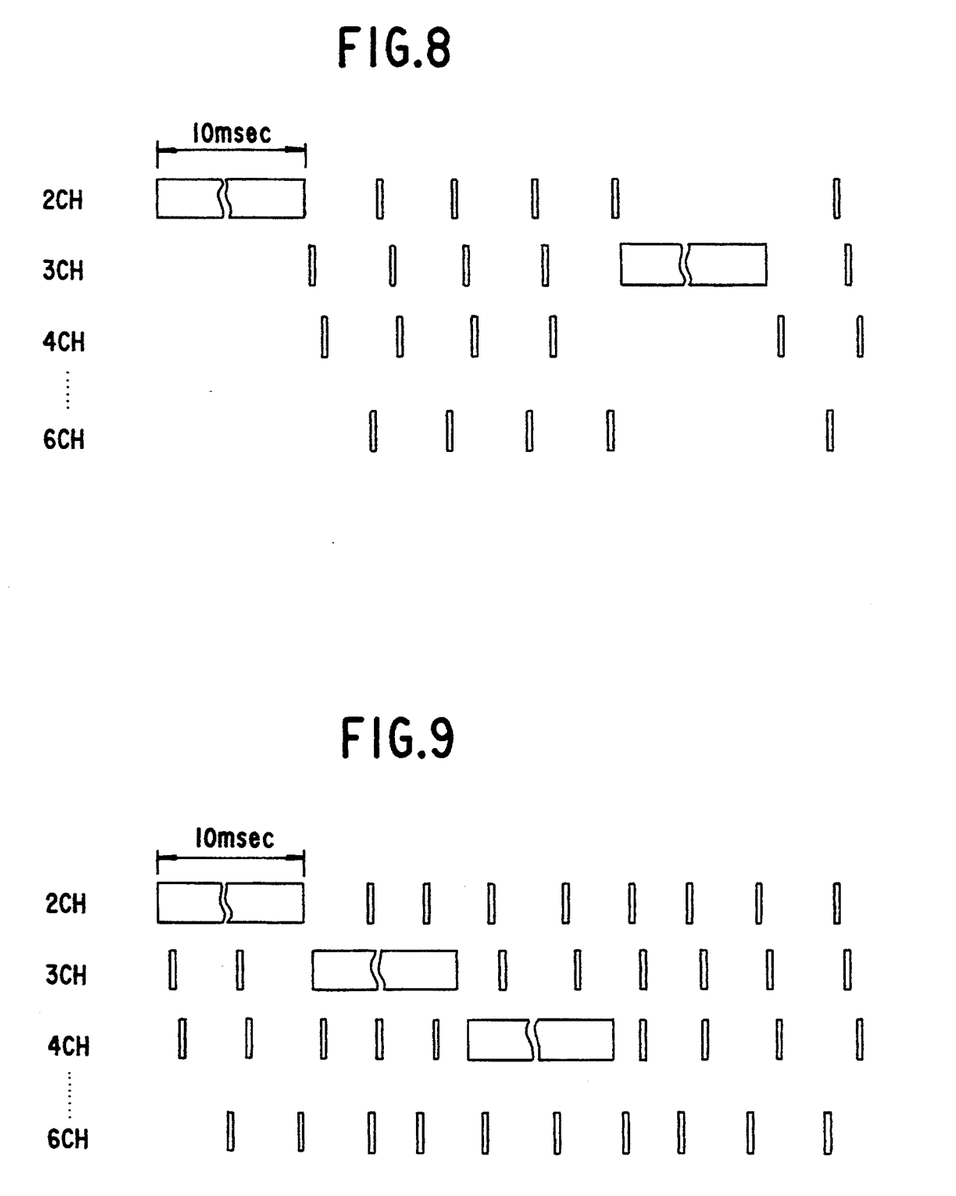
FIG. 8 is a schematic diagram showing jamming signals oscillated by a single oscillator.
FIG. 9 is a schematic diagram showing jamming signals oscillated by two oscillators.

In operation for channels 2 and 3 in the latter example, the switches 29a and 30a are closed at the same time, so that the voltage Vt1 is applied to the first VCO 17 to form a PLL, and the capacitor 32a is charged with the voltage. The switch 20b is closed to apply the audio jamming signal for channel 2 to subscribers for the period of 10 msec, as shown in FIG. 8. Thereafter, switches 30a and 30b are alternately closed at regular intervals, thereby applying video jamming signals. Then, the switches 29b and 30b are closed for 10 msec, thereby applying the audio jamming signal for channel 3. Such an operation is repeated to the jamming signals for channels 2 and 3.

Similarly, the second oscillator OSC2 generates jamming signal for channels 4 to 6. Daring the application of the audio jamming signal for some of the channels (2CH and 3CH in FIG. 8), the other channel (4CH to 6CH) are not supplied with jamming signals, as shown in FIG. 8.

FIG. 9 shows the operation of the former example. The first oscillator OSC1 produces audio jamming signals for channels 2 to 6, and the second oscillator OSC2 generates video jamming signals for the channels. Consequently, there is no blank periods as shown in FIG. 9.

Since the amplifier 43 has a large impedance, the charge stored in the capacitor (32) is prevented from decreasing during the formation of the PLL. In addition, since the amplifier 42 has a small impedance, the capacitor is quickly charged. Thus, the control voltage Vt1 is stored in the capacitor without reducing.

It will be understood that the control voltage Vt1 does not change between the charging and the discharging of the capacitor, in spite of the offset of DC voltage inherent in the analog switch at ON/OFF thereof.

Figure 10:
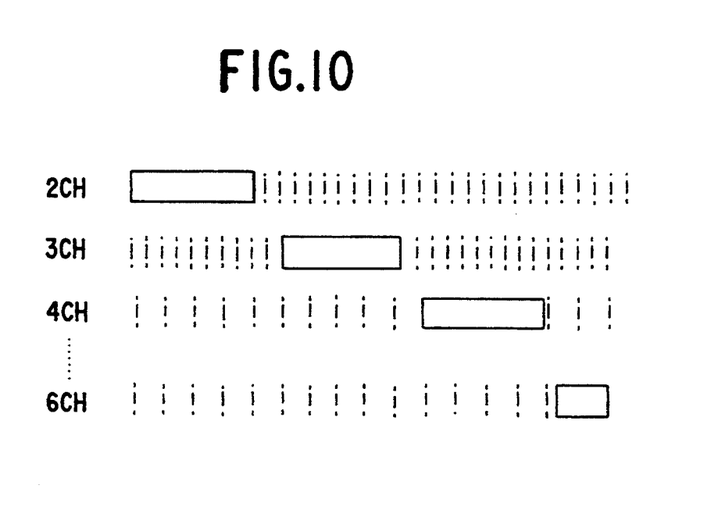
FIG. 10 is a schematic diagram showing jamming signals for a weighting operation.

FIG. 10 shows an operation for weighting video jamming signals for particular channels 2 and 3. To this end, switches 30a and 30b are closed at a double frequency to produce two times video jamming signals as large as the other channels. Thus, the video jamming signals for channels 2 and 3 are weighted as shown in FIG. 10, thereby enhancing the scrambling of the channels.

Figure 11:
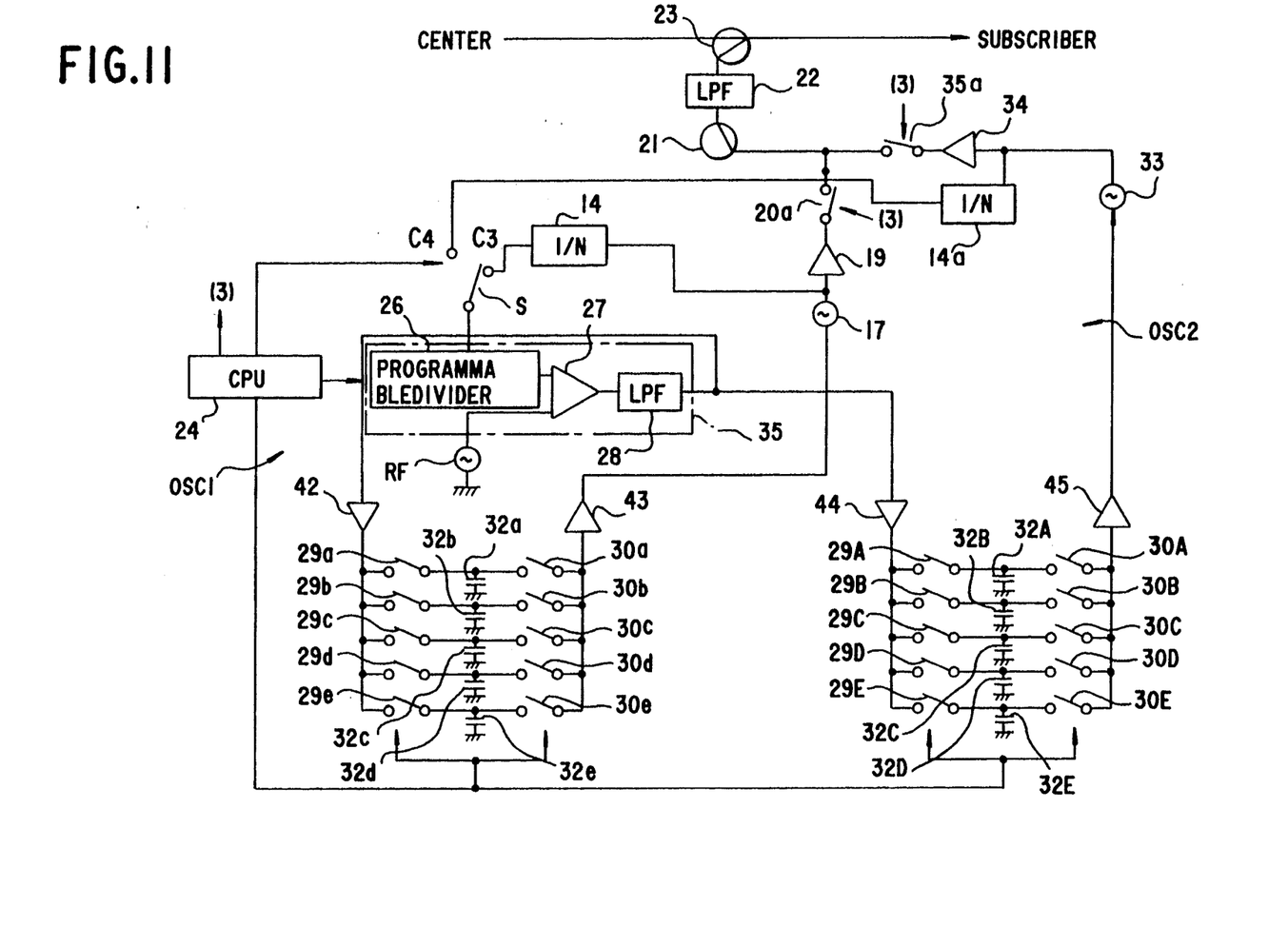
FIG. 11 is a schematic diagram showing a fifth embodiment.

FIG. 11 shows the fifth embodiment. The same parts as the previous embodiments are identified with the same reference numerals as FIGS. 1 and 7.

The system has the first oscillator OSC1 and the second oscillator OSC2, and the control voltage generator 35, and the CPU 24 which are used common to the first and second oscillators. A switch S having two fixed contacts C3 and C4 is connected to the programmable divider 26 for selectively connecting the first oscillator OSC1 and the second oscillator OSC2 to the programmable divider.

The first oscillator OSC1 comprises the first VCO 17 connected to the contact C3 through the 1/N divider 14, analog switches 29a to 29e connected to the LPF 28 of the control voltage generator 35 through the amplifier 42, capacitors 32a to 32e, and analog switches 30a to 30e connected to the VCO 17 through the amplifier 43.

The second oscillator OSC2 comprises the second VCO 33 the output of which is connected to the contact C4 through a 1/N divider 14a, analog switches 29A to 29E connected to the LPF 28 through a buffer amplifier 44, analog switches 30A to 30E connected to the VCO 33 through a buffer amplifier 45, and capacitors 32A to 32E connected between analog switches.

Outputs of the CPU 24 are connected to the programmable divider 26, switches S, 20a, 35a, analog switched 29a to 29e, 30a to 30e, 29A to 29E, 30A to 30E.

When the contact C3 is closed by the output of the CPU 24, the PLL is formed at the first oscillator OSC1. When the contact C4 is closed by the output of the CPU, the PLL is formed in the second oscillator OSC2.

The system of FIG. 11 operates in a similar manner to the system of FIG. 7 to produce jamming signals of FIGS. 8 and 9. However, the system of FIG. 11 eliminates disadvantages in the system of FIG. 7 as described hereinafter.

If the system of FIG. 7 is arranged in such that the first oscillator OSC1 produces the audio jamming signal and the second oscillator OSC2 produces the video jamming signal shown in FIG. 9, both the jamming signals are formed by separate PLLs of respective oscillators. It is difficult to manufacture both oscillators to have the same characteristic so that the control voltage generator 35 in the first oscillator OSC1 may generate the same control voltage as the second oscillator OSC2, and hence VCO 17 produces the same output frequency as that of OSC2. Therefore, it is likely that scrambling is not effectively performed.

To the contrary, in the system of FIG. 11, the single control voltage generator 35 is provided to produce the same control voltage for the audio jamming signal and the video jamming signal. Thus, both VCOs 17 and 33 oscillate at the same frequency for the designated channel. Thus, effective scrambling can be performed.

Figure 12:
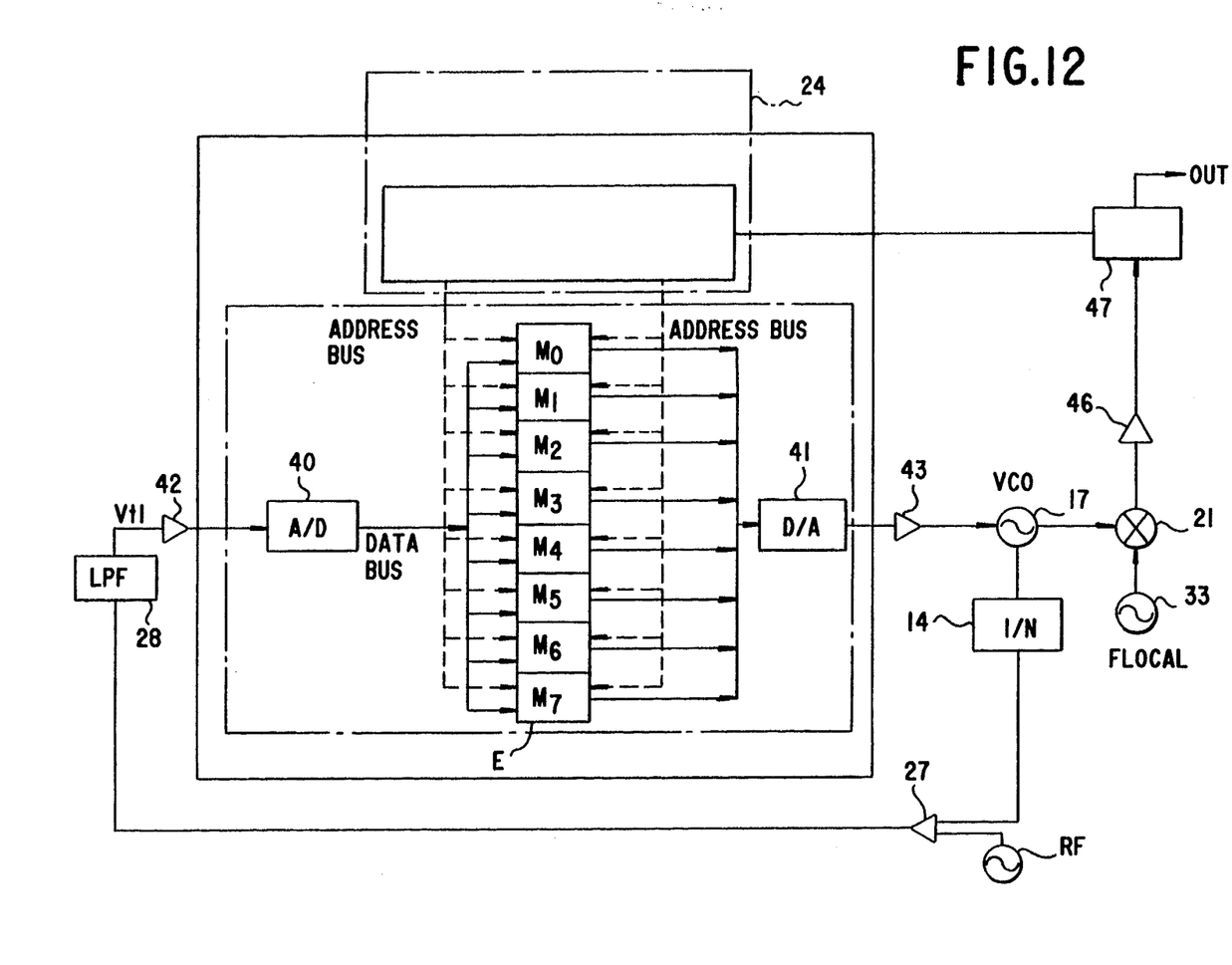
FIG. 12 is a schematic diagram showing a sixth embodiment.

Referring to FIG. 12 showing the sixth embodiment of the present invention, a memory E having a series of memory units Mo to M7 is provided in stead of the capacitors 32a to 32e. Selection of the memories is performed by addressing the memories.

The PLL is completed with the write/read data buses of the memory E.

The control voltage Vt1 is converted to digital value by an A/D converter 40 and stored in a corresponding memory unit M in accordance with the addressing of the CPU 24. When scrambling, the control voltage Vt1 stored in the memory unit is read in accordance with the addressing, and converted to an analog value by a D/A converter 41, which is applied to the VCO 17. The output of the VCO 17 is mixed with the output of the VCO 33 of the other oscillating unit (not shown) at the combiner 21 and fed to subscribers through an amplifier 46 and a gate 47.

In the system of the previous embodiments, the control voltage is stored in the capacitor. The stored voltage is liable to reduce because of self-discharge. Therefore, it is undesirable to scramble for a long period.

In the system of FIG. 12, the control voltage Vt1 stored in the memory is maintained at the set value while the capacitor in the previous embodiments. Accordingly, the period for scrambling can be set longer than the previous systems, thereby effectively scrambling the CATV signal.

In accordance with the present invention, the DC voltage is provided by a filter in the PLL. Consequently, the A/D and D/A converters provided in the conventional system are not used, so that the manufacturing cost is reduced. Since the DC voltage is corrected in the PLL at every jamming operation, the calibration of the drift of the frequency is not performed, whereby a jamming signal having a constant frequency can be obtained.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for producing an oscillating signal, said system comprising:
    a phase-locked loop (PLL) including a control voltage producing circuit,
    the control voltage producing circuit being provided for producing a plurality of predetermined control voltages, with each predetermined control voltage corresponding to a desired frequency;
    a plurality of memories provided in the phase-locked loop for storing the predetermined control voltages;
    control means connected to the plurality of memories for storing the predetermined control voltages in the memories in a state where the phase-locked loop is closed and for deriving at least one of the predetermined control voltages stored in the memories in a state where the phase-locked loop is opened;
    a voltage-controlled oscillator provided in the phase-locked loop to be operated by the predetermined control voltage derived from one of the memories for producing said oscillating signal having a desired frequency dependent on the derived voltage.

2. A system according to claim 1, further comprising an A/D converter provided between the memories and the control voltage producing circuit, and a D/A converter provided between the memories and the voltage-controlled oscillator.

3. A system for producing an oscillating signal, said system comprising:
    a first voltage-controlled oscillator (VCO) for producing a first oscillating signal;
    a control voltage producing circuit including a reference frequency generator for generating a reference frequency, a divider for dividing an output of the VCO, a phase detector for producing a difference phase between the reference frequency generator and the divider, and a low pass filter connected to an output of the phase detector for producing a plurality of predetermined control voltages each of which corresponds to a desired frequency;
    an A/D converter connected to an output of the low pass filter;
    a plurality of memories for storing the predetermined control voltages;
    a D/A converter provided between an output of the voltage storing means and the first voltage-controlled oscillator, wherein the first voltage-controlled oscillator, the control voltage producing circuit, the A/D converter, the memories, and the D/A converter are configured to form a phase-locked loop;
    control means for storing the predetermined control voltages in the memories in a state where the phase-locked loop is closed and for deriving at least one of the predetermined control voltages stored in the memories in a state where the phase-locked loop is opened, wherein the first voltage-controlled oscillator is provided to be operated by a desired control voltage derived from one of the memories for producing said first oscillating signal having a desired frequency dependent on the derived voltage.

4. A system according to claim 3, further comprising a second voltage-controlled oscillator for producing a second oscillating signal, and combining means for combining the first oscillating signal and the second oscillating signal for producing the oscillating signal.

5. A system for producing jamming signal to be inserted in a band of CATV, said system comprising:
    a first voltage-controlled oscillator (VCO) for producing a first oscillating signal;
    a control voltage producing circuit including a reference frequency generator for generating a reference frequency, a divider for dividing the first oscillating signal from the first voltage-controlled oscillator, a phase detector for producing a difference phase between the output of the reference frequency generator and the divider, and a low pass filter connected to an output of the phase detector for producing a plurality of predetermined control voltages each of which corresponds to a desired frequency;
    an A/D converter connected to an output of the low pass filter;
    a plurality of memories for storing the predetermined control voltages;
    a D/A converter provided between the voltage storing means and the first voltage-controlled oscillator, wherein the first voltage-controlled oscillator, the control voltage producing circuit, the A/D converter, the memories, and the D/A converter are configured to form a phase-locked loop;
    control means connected to the memories for storing the predetermined control voltages in the memories in a state where the phase-locked loop is closed and for deriving at least one of the predetermined control voltages stored in the memories in a state where the phase-locked loop is opened, wherein the first voltage-controlled oscillator is provided to be operated by a control voltage derived from one of the memories for producing a first oscillating signal having a frequency dependent on the derived voltage;
    a second voltage-controlled oscillator for producing a second oscillating signal; and
    combining means for combining the first oscillating signal and the second oscillating signal for producing the jamming signal.

6. A method for producing an oscillating signal, said method comprising the steps of:
    forming a phase-locked loop including a control voltage producing circuit;
    producing a plurality of predetermined control voltages by the control voltage producing circuit, each of the control voltages corresponding to a desired frequency;
    storing the predetermined control voltages in memories in a state where the phase-locked loop is closed and deriving at least one of the predetermined control voltages stored in the memories in a state where the phase-locked loop is opened; and
    producing said oscillating signal by a voltage-controlled oscillator in dependence on the derived predetermined control voltage.

* * * * *